United States Patent
Basnet et al.

(10) Patent No.: US 12,287,400 B2
(45) Date of Patent: Apr. 29, 2025

(54) OBJECT DETECTION SYSTEM AND OBJECT DETECTION METHOD

(71) Applicant: WISTRON NEWEB CORPORATION, Hsinchu (TW)

(72) Inventors: Modick Bahadur Basnet, Hsinchu (TW); Chi-Cheng Kuo, Hsinchu (TW); Jeng-Da Li, Hsinchu (TW)

(73) Assignee: WISTRON NEWEB CORPORATION, Hsinchu (TW)

(*) Notice: Subject to any disclaimer, the term of this patent is extended or adjusted under 35 U.S.C. 154(b) by 441 days.

(21) Appl. No.: 17/841,737

(22) Filed: Jun. 16, 2022

(65) Prior Publication Data
US 2022/0413131 A1   Dec. 29, 2022

(30) Foreign Application Priority Data
Jun. 23, 2021   (TW) ................................ 110122838

(51) Int. Cl.
| | | |
|---|---|---|
| *G01S 13/931* | (2020.01) | |
| *G01S 13/42* | (2006.01) | |
| *G01S 13/56* | (2006.01) | |
| *G01S 13/60* | (2006.01) | |
| *G01S 13/66* | (2006.01) | |

(52) U.S. Cl.
CPC ............ *G01S 13/931* (2013.01); *G01S 13/42* (2013.01); *G01S 13/56* (2013.01); *G01S 13/60* (2013.01); *G01S 13/66* (2013.01)

(58) Field of Classification Search
CPC ........ G01S 13/931; G01S 13/42; G01S 13/56; G01S 13/60; G01S 13/66
See application file for complete search history.

(56) References Cited

U.S. PATENT DOCUMENTS

| | | | | |
|---|---|---|---|---|
| 5,638,281 A | * | 6/1997 | Wang ...................... | G01S 7/021 |
| | | | | 342/29 |
| 2019/0285743 A1 | * | 9/2019 | Kaino ................... | G01S 13/424 |

* cited by examiner

*Primary Examiner* — Vladimir Magloire
*Assistant Examiner* — Nazra Nur Waheed
(74) *Attorney, Agent, or Firm* — McClure, Qualey & Rodack, LLP (57) ABSTRACT

An object detection system and an object detection method are provided. The object detection system includes a transmitter, a receiver, and a processing circuit. The processing circuit is configured to: control the transmitter to transmit by a predetermined field pattern multiple detection signals in different time frames along a main beam direction; control the receiver to receive multiple reflection signals; correspondingly calculate multiple received powers, distances and velocities; perform a clustering process on the distances and the velocities to find the received powers, the distances and the velocities corresponding to a main target; perform an association process to track the distances and the received powers of the main target in the different time frames; and calculate a power and a distance trend of the main target, and determine whether an early alarm event is to occur according to a relationship between the power and the distance trend.

14 Claims, 9 Drawing Sheets

OBJECT DETECTION SYSTEM AND OBJECT DETECTION METHOD

CROSS-REFERENCE TO RELATED PATENT APPLICATION

This application claims the benefit of priority to Taiwan Patent Application No. 110122838, filed on Jun. 23, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an object detection system and an object detection method, and more particularly to an object detection system and an object detection method for determining whether an early warning event is to occur.

BACKGROUND OF THE DISCLOSURE

A radar system has a radio frequency (RF) module, a transmitter (TX) and a receiver (RX) for radiation pattern control. Signals transmitted by the radar system hit an object and are reflected to the receiver, and the received signals are processed, so as to determine a range and a velocity of the object that is hit by the signals and reflects the signals.

Figure 1:
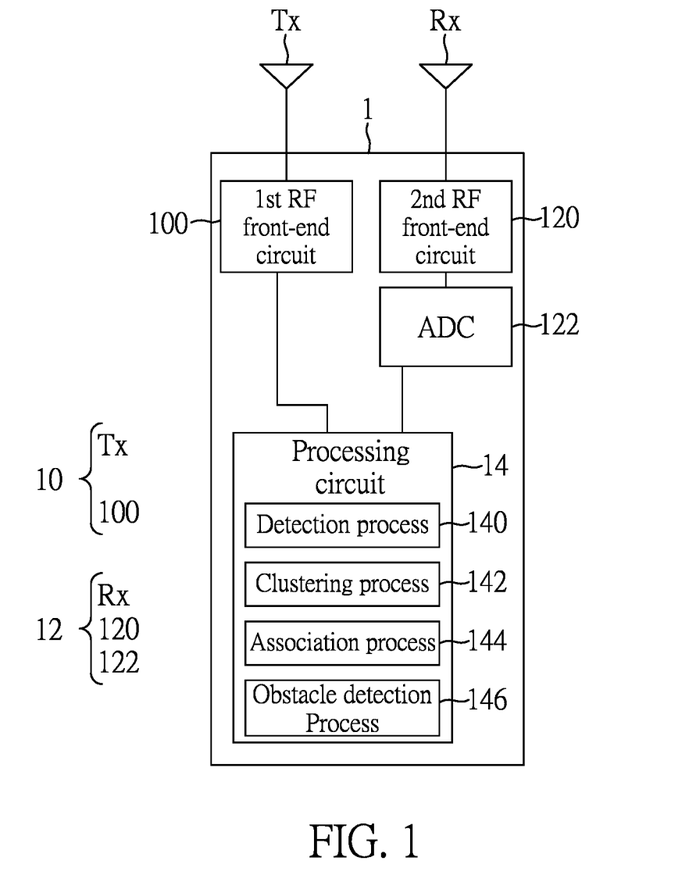
FIG. 1 is a functional block diagram of an object detection system according to one embodiment of the present disclosure.

In the conventional radar system, at least two receiver antennas as shown in FIG. 1 are required to determine one of an azimuth angle and an elevation angle, and at least three antennas are required to determine the azimuth angle and the elevation angle at the same time.

Furthermore, the radar system has a radio frequency (RF) front-end circuit to control the transmitter and the receiver. For the multiple antennas mentioned above, each antenna needs an analog-to-digital converter circuit to convert analog signals into digital signals, so as to be further processed by a back-end processing circuit. Therefore, an increase in the number of the RF front-end circuit increases the cost and complexity of the radar system.

In addition, when the above-mentioned radar system is used as a vehicle radar system, in order to further estimate a track of the object, a more complicated radar system must be used with a camera, causing higher costs and complexity.

SUMMARY OF THE DISCLOSURE

In response to the above-referenced technical inadequacies, the present disclosure provides an object detection system and an object detection method for determining whether an early warning event is to occur.

In one aspect, the present disclosure provides an object detection system, which includes a transmitter, a receiver and a processing circuit. The processing circuit is connected to the transmitter and the receiver. The processing circuit is configured to: control the transmitter to transmit by a predetermined field pattern a plurality of detection signals in different time frames along a main beam direction, in which the main beam direction corresponds to a main beam in the predetermined field pattern beamformed by the transmitter; control the receiver to receive a plurality of reflection signals generated by reflections of the plurality of detection signals; correspondingly calculate a plurality of received powers, a plurality of distances, and a plurality of velocities according to the plurality of reflection signals; perform a clustering process on the plurality of distances and the plurality velocities to find the received powers, the distances, and the velocities corresponding to at least one main target; perform an association process to track the distances and the received powers of the at least one main target in the different time frames; and calculate a power trend and a distance trend of the at least one main target, and determine whether an early warning event is to occur according to a relationship between the power trend and the distance trend. In response to the distance trend indicating that the at least one main target is approaching, and the power trend indicating that the received powers corresponding to the at least one main target are increasing, the processing circuit is configured to determine that the early warning event is to occur with the at least one main target.

In another aspect, the present disclosure provides an object detection method for use in a detection system. The object detection system includes a transmitter, a receiver, and a processing circuit, and the detection method includes configuring the processing circuit to: control the transmitter to transmit by a predetermined field pattern a plurality of detection signals in different time frames along a main beam direction, in which the main beam direction corresponds to a main beam in the predetermined field pattern beamformed by the transmitter; control the receiver to receive a plurality of reflection signals generated by reflections of the plurality of detection signals; correspondingly calculate a plurality of received powers, a plurality of distances, and a plurality of velocities according to the plurality of reflection signals; perform a clustering process on the plurality of distances and the plurality velocities to find the received powers, the distances, and the velocities corresponding to at least one main target; perform an association process to track the distances and the received powers of the at least one main target in the different time frames; and calculate a power trend and a distance trend of the at least one main target, and determine whether an early warning event is to occur according to a relationship between the power trend and the distance trend. In response to the distance trend indicating that the at least one main target is approaching, and the power trend indicating that the received powers corresponding to the at least one main target are increasing, the processing circuit is configured to determine that the early warning event is to occur with the at least one main target.

Therefore, the object detection system and the object detection method provided by the present disclosure allow a trajectory of an object to be estimated without additional hardware modification, and are suitable for situations where an angle of the object relative to the transmitter is not known with very high accuracy and where there are multiple-target objects.

Further, in the present disclosure, there is no need to accurately determine an angle of the object. The relationship between the distance trend and the power trend can be determined by calculating the distances of the reflection signals, the distance between the object and the receiver, and the received power. When it is only necessary to estimate whether an object forms an obstacle, since the number of antennas required is small, the numbers of corresponding RF front-end circuits and analog-to-digital converters are also small. Therefore, the object detection system and object detection method of the present disclosure are superior to conventional radar systems in terms of cost and complexity.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

FIG. 1 is a functional block diagram of an object detection system according to one embodiment of the present disclosure. Referring to FIG. 1, an embodiment of the present disclosure provides an object detection system 1, which includes a transmitter 10, a receiver 12 and a processing circuit 14. The transmitter 10 can include a transmitting antenna TX and a first radio frequency (RF) front-end circuit 100, and the receiver 12 can include a receiving antenna RX, a second RF front-end circuit 120, and an analog-to-digital converter (ADC) 122.

The first RF front-end circuit 100 and the second RF front-end circuit 120 are respectively used to control the transmitter 10 and the receiver 12, and can be integrated in one or a plurality of chips. In addition, the ADC 122 can be electrically connected between the second RF front-end circuit 120 and the processing circuit 14 to convert analog signals into digital signals, so as to be further processed by the processing circuit 14.

In an embodiment of the present disclosure, the object detection system 1 shown in FIG. 1 can operate under the condition that there is only a single receiver with a narrow-beam antenna field pattern, thereby reducing the need for RF front-ends and ADCs. The so-called "narrow-beam" can be defined by a beam width of an antenna pattern. For example, when an angle between two directions where radiation power drops by 3 dB on both sides of a main beam direction (that is, a direction with a maximum radiation power) is less than 60 degrees, the angle can be regarded as a narrow-beam, and characteristics of the narrow-beam are used to detect objects in the following embodiments.

Further, the processing circuit 14 can be, for example, a microcontroller, a microprocessor, or a digital signal processor (DSP). The processing circuit 14 is connected to the transmitter 10 and the receiver 12.

In an embodiment of the present disclosure, the processing circuit 14 can be used to execute a detection process 140, a clustering process 142, an association process 144, and an obstacle detection process 146. Generally speaking, the detection process 140 is mainly used to transmit detection signals, and to receive and process the reflected detection signals. The clustering process 142 is to group processed results based on the similarity, and the association process 144 is to group the detected signals. The results are compared and a possible main target is taken out, and the obstacle detection process 146 is used to analyze whether an early warning event may occur with the main target.

Figure 2:
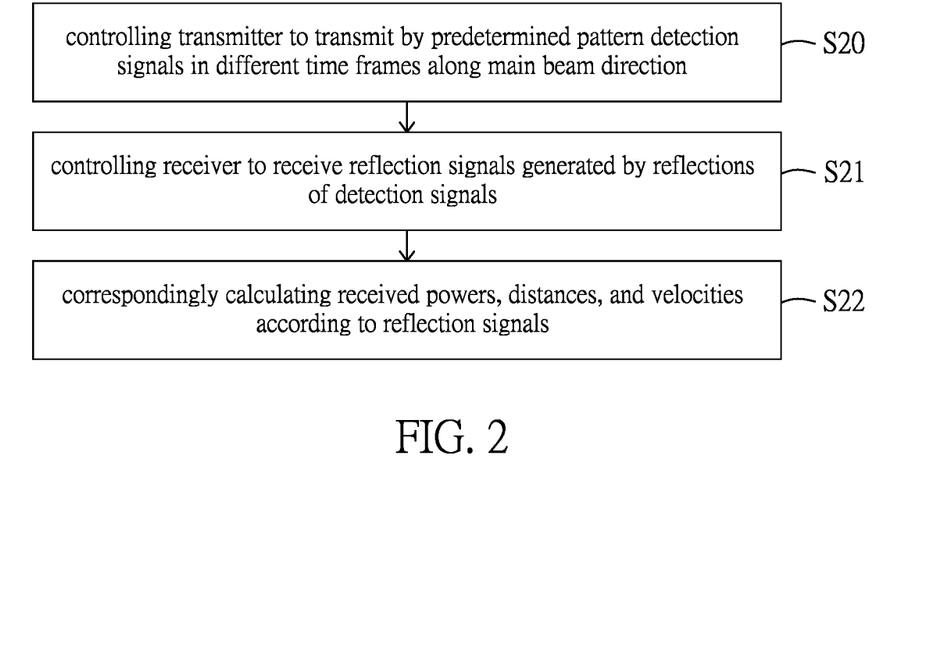
FIG. 2 is a flowchart of a detection process according to one embodiment of the present disclosure.
Figure 3:
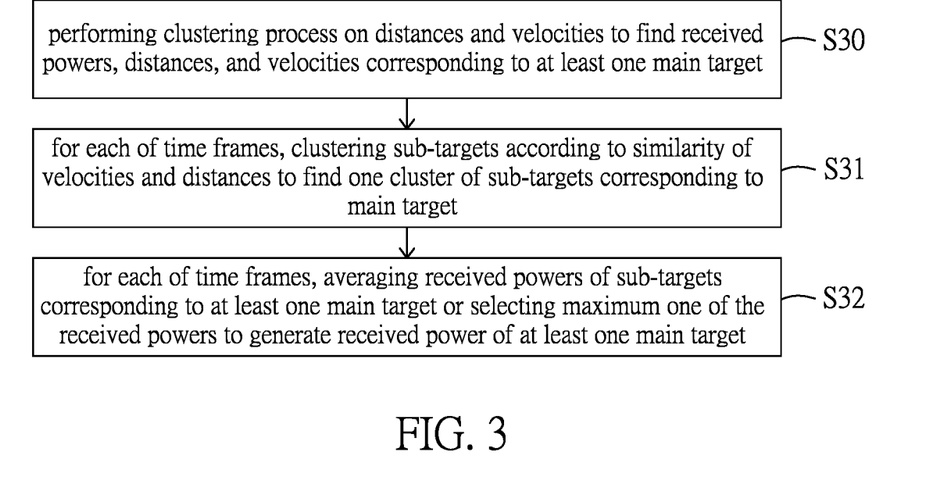
FIG. 3 is a flowchart of a clustering process according to one embodiment of the present disclosure.
Figure 4:
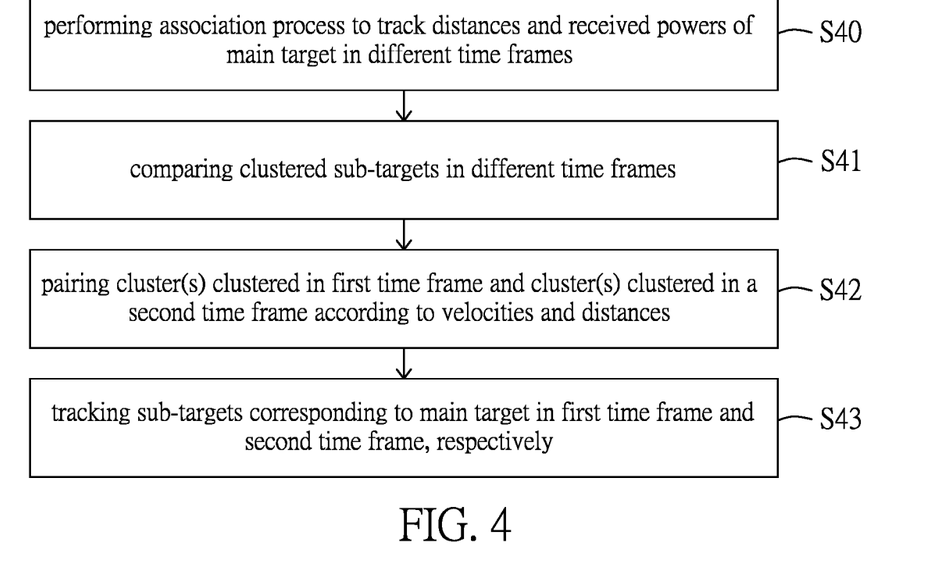
FIG. 4 is a flowchart of an association process according to one embodiment of the present disclosure.
Figure 5:
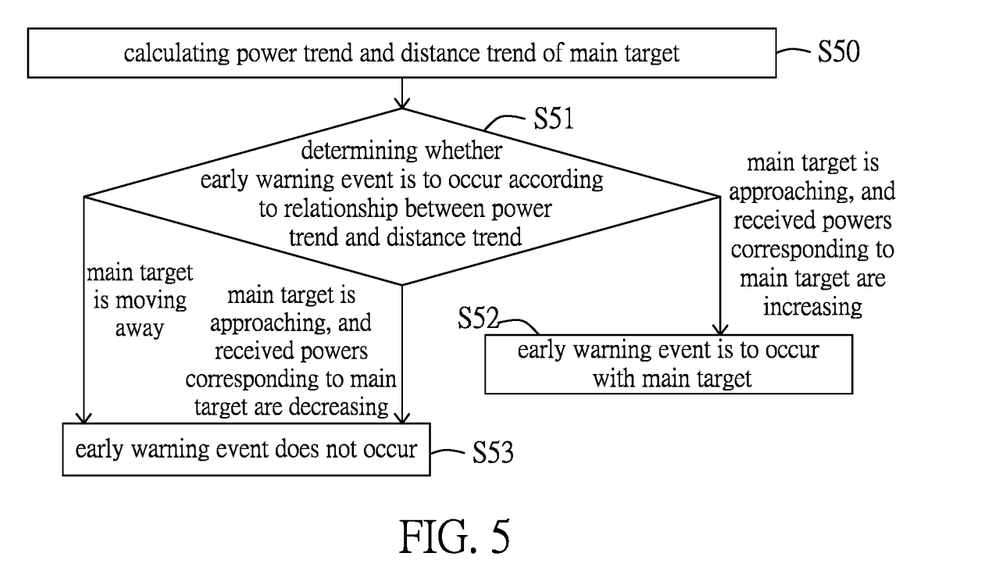
FIG. 5 is a flowchart of an obstacle detection process according to one embodiment of the present disclosure.

An object detection method of the present disclosure will be described below with reference to FIGS. 2 to 5. The object detection method is applicable to the object detection system 1 of FIG. 1, but the present disclosure is not limited thereto. FIG. 2 is a flowchart of a detection process according to one embodiment of the present disclosure, FIG. 3 is a flowchart of a grouping process according to one embodiment of the present disclosure, FIG. 4 is a flowchart of an association process according to one embodiment of the present disclosure, and FIG. 5 is a flowchart of an obstacle detection process according to one embodiment of the present disclosure.

As shown in FIG. 2, the detection process 140 includes configuring the processing circuit 14 to perform the following steps.

Step S20: controlling the transmitter 10 to transmit by a predetermined pattern a plurality of detection signals in different time frames along a main beam direction. Here, the different time frames can be, for example, a predetermined period or a variable period by which the plurality of detection signals are transmitted.

Figure 6:
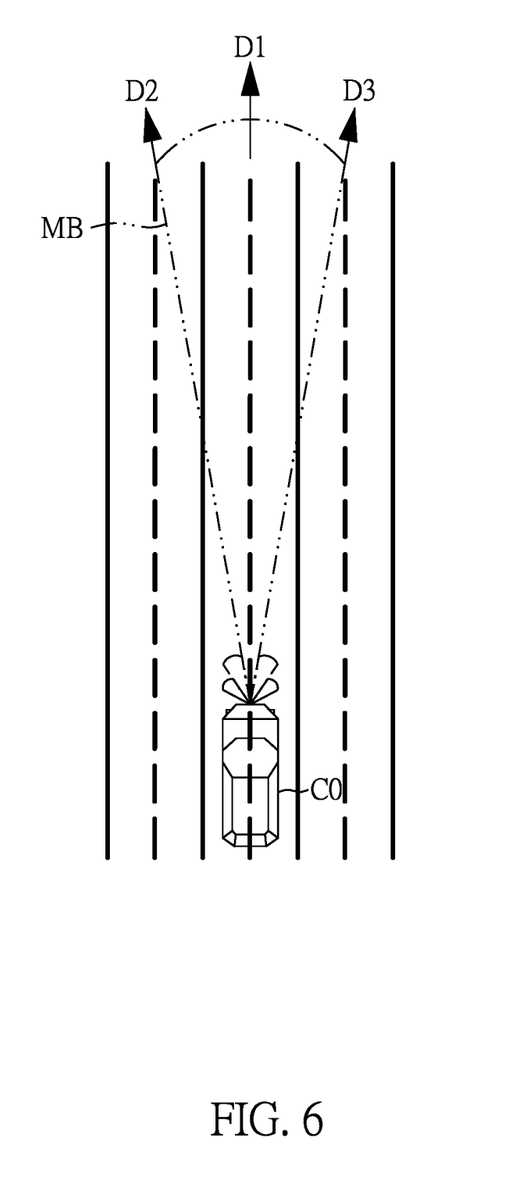
FIG. 6 is a schematic diagram showing transmission of a detection signal according to one embodiment of the present disclosure.

Reference can be made to FIG. 6, which is a schematic diagram showing a transmission of a detection signal according to one embodiment of the present disclosure. As shown in FIG. 6, the transmitter 10 can be disposed on a vehicle C0, and a main beam direction D1 corresponds to a main beam MB in the predetermined field pattern beamformed by the transmitter 10. The aforementioned narrow-beam characteristics are defined by a beam width of the main beam MB. For example, an angle between two directions D2 and D3 where radiation power drops by 3 dB on both sides of the main beam direction D1 (that is, a direction with a maximum radiation power) is less than 60 degrees.

Step S21: controlling the receiver 12 to receive a plurality of reflection signals generated by reflections of the plurality of detection signals.

Step S22: correspondingly calculating a plurality of received powers, a plurality of distances, and a plurality of velocities according to the plurality of reflection signals. In the embodiment of the present disclosure, since a simple system architecture is utilized, the detection process 140 (which is different from a conventional radar that requires multiple antennas for angle detections) does not measure incident angles of the reflection signals, but merely calculates the received powers, the distances and the velocities corresponding to the reflection signal signals.

Further, as shown in FIG. 3, the clustering process 142 includes configuring the processing circuit 14 to perform the following step.

Step S30: performing a clustering process on the plurality of distances and the plurality velocities to find the received powers, the distances, and the velocities corresponding to at least one main target.

In detail, the receiver 12 receives the plurality of reflection signals that are returned from reflections of the plurality of detection signals, and corresponding information of a plurality of sub-targets is generated after the received reflection signals are processed. Therefore, the information of these sub-targets needs to be clustered to find information corresponding to the main target.

Therefore, the clustering process further includes the following steps.

Step S31: for each of the time frames, clustering the plurality of sub-targets according to a similarity of the plurality of velocities and the plurality of distances to find one cluster of the sub-targets corresponding to the main target.

Step S32: for each of the time frames, averaging received powers of the sub-targets corresponding to the at least one main target or selecting a maximum one of the received powers to generate the received power of the at least one main target.

Therefore, the above-mentioned clustering process 142 forms one or more detection clusters based on the similar distances and velocities. In response to each detection cluster being regarded as corresponding to a main target, the received powers corresponding to this main target are averaged and stored. In addition, since the clustering is performed for each time frame, if the main target has different distances in different time frames, whether the main target moves relative to the receiver 12 (or the vehicle provided with the receiver) can be determined.

Further, as shown in FIG. 4, the association process 144 includes configuring the processing circuit 14 to perform the following step.

Step S40: performing an association process to track the distances and the received powers of the main target in different time frames.

In detail, the association process 144 tracks a new set of sub-targets in a current time frame and compare this new set of sub-targets with the set of sub-targets detected in a previous time frame. The association process 144 can pair the set of sub-targets in the current time frame with the most similar set of the sub-targets in the previous time frame according to the distances and the velocities. In other words, the association process 144 is mainly used to track a history of the main target, such that a radar system can track the main target according to the distances, velocities, angles, and received powers of the received reflection signals.

Therefore, the association process 144 can further include the following steps.

Step S41: comparing the clustered sub-targets in the different time frames.

Step S42: pairing the cluster(s) clustered in a first time frame and the cluster(s) clustered in a second time frame according to the velocities and the distances.

Step S43: tracking the sub-targets corresponding to the main target in the first time frame and the second time frame, respectively.

Based on the above description, determination criteria can be added to the clustering process 142 and the association process 144. Further reference can be made to FIG. 7, which is another flowchart of the clustering process 142 and the association process 144 according to one embodiment of the present disclosure.

Figure 7:
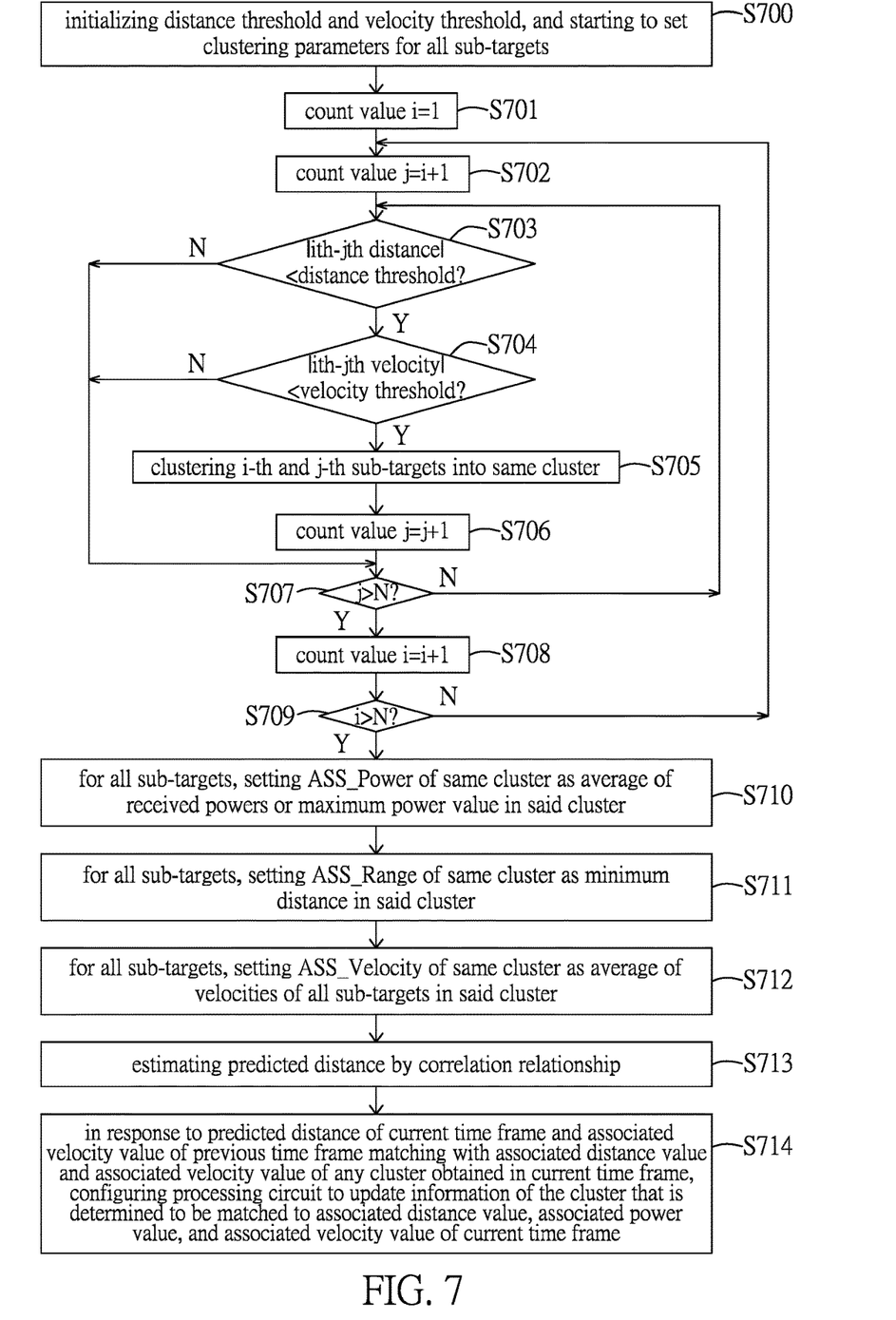
FIG. 7 is another flowchart of the clustering process and the association process according to one embodiment of the present disclosure.

As shown in FIG. 7, the clustering process 142 and the association process 144 can include the following steps.

Step S700: initializing a distance threshold and a velocity threshold, and starting to set clustering parameters for all sub-targets (for example, from 1 to N).

Step S701: setting a count value i=1.

Step S702: setting a count value j=i+1.

Step S703: determining whether an absolute difference between a distance of an i-th sub-target and a distance of a j-th sub-target is less than the distance threshold.

In response to the absolute difference between the distance of the i-th sub-target and the distance of the j-th sub-target being less than the distance threshold, the clustering process 142 and the association process 144 proceed to step S704 for determining whether an absolute difference between a velocity of the i-th sub-target and a velocity of the j-th sub-target is less than the velocity threshold.

In response to the absolute difference between the velocity of the i-th sub-target and the velocity of the j-th sub-target being less than the velocity threshold, the clustering process 142 and the association process 144 proceed to step S705 for clustering the i-th sub-target and the j-th sub-target into the same cluster.

Step S706: setting the count value j=j+1.

In response to the absolute difference between the distance of the i-th sub-target and the distance of the j-th sub-target being not less than the distance threshold in step S703, and in response to the absolute difference between the velocity of the i-th sub-target and the velocity of the j-th sub-target being not less than the velocity threshold, the clustering process 142 and the association process 144 proceed to step S706.

Step S707: determining whether j is greater than N.

In response to j being not greater than N, the clustering process 142 and the association process 144 return to step S702. In response to j being greater than N, the clustering process 142 and the association process 144 proceed to step S708 for setting the count value i=i+1.

Step S709: determining whether i is greater than N.

In response to i being not greater than N, the clustering process 142 and the association process 144 return to step S701.

In response to i being greater than N, the clustering process comes to an end, and the clustering process 142 and the association process 144 proceed to step S710. It should be noted that the cluster after the clustering process corresponds to the main target mentioned in the previous steps.

In detail, in the above steps, due to a limited range resolution of the radar, multiple reflection signals may be received for the same object. In other words, these reflection signals correspond to multiple sub-targets, but may come from the same main target. By setting the distance threshold, if the distance between different sub-targets (even from different objects) is less than the distance threshold, the two sub-targets are clustered into the same cluster. That is, the two sub-targets are regarded as coming from the same main target.

On the other hand, even in the presence of multiple targets, the clustering process 142 and the association process 144 can be used to distinguish multiple main targets. Then, in the subsequent obstacle detection process 146, whether an early warning event is to occur with any detected main target can be determined.

The above processes explain how the different sub-targets that are detected can form a cluster according to the distances and the velocities. When the different sub-targets have the distances and the velocities that are matched to one another, such sub-targets can be regarded as coming from the same main target.

Figure 8:
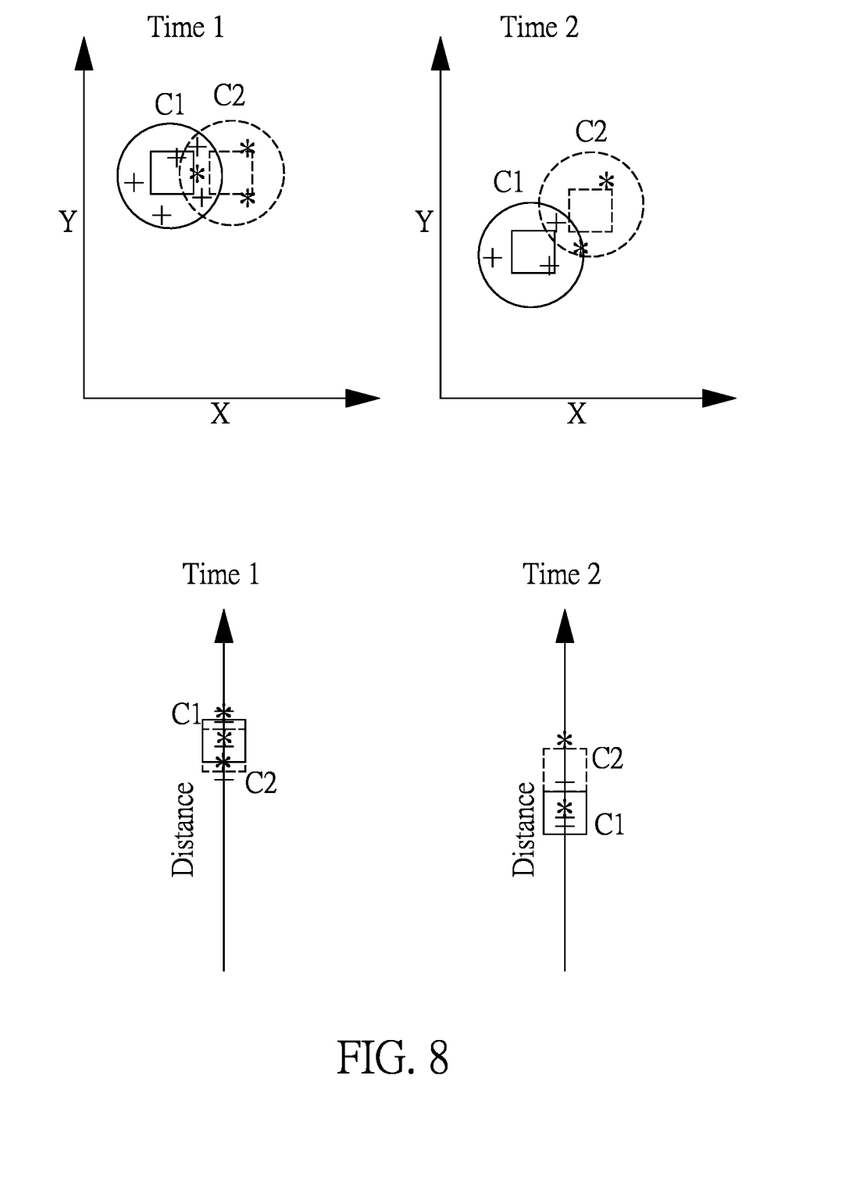
FIG. 8 is a schematic diagram showing a plurality of sub-targets being clustered by using the clustering process according to one embodiment of the present disclosure.

Reference is further made to FIG. 8, which is a schematic diagram showing that a plurality of sub-targets are clustered by using the grouping process of one embodiment of the present disclosure. Two objects and a plurality of detected sub-targets are shown in FIG. 8, in which "+" represents the sub-targets detected from a first object, and "*" represents the sub-targets detected from a second object. The difference between these two objects is velocity. From time 1 to time 2, it can be seen that the first object moved farther than the second object.

By performing steps S700 to S709, the distance and the velocities of all the detected sub-targets can be compared, and then different clusters can be formed.

For example, the sub-targets represented by "+" will be clustered in a cluster C1 due to having similar distances and velocities, and the sub-targets represented by "*" will be clustered in a cluster C2 due to having similar distances and velocities. In this embodiment, only distance information and velocity information are needed to complete the above clustering process, and angle information is not necessary.

However, in order to further track the main target that is detected (that is, to track the clustering result through the association process), the following steps need to be further performed.

Step S710: for all the sub-targets, setting an associated power value ASS_Power of the same cluster as an average of the received powers or the maximum power value in said cluster.

For example, three sub-targets are detected from one object, and the three sub-targets have distances r1, r2, r3, powers p1, p2, p3, and velocities v1, v2, v3, respectively. Here, a distance relationship is r1>r2>r3, and a power relationship is p2>p1>p3.

A purpose of step S710 is to use a maximum power or an average of the received powers of the three sub-targets to represent the cluster. In other words, the associated power value ASS_Power of the cluster is set as the maximum power p2, or the associated power value ASS_Power of the cluster is set as the average of the received powers (p1+p2+p3)/3.

Step S711: for all the sub-targets, setting an associated distance value ASS_Range of the same cluster as a minimum distance in said cluster. For example, the associated distance value ASS_Range of this cluster is set as the shortest distance r1. When determining whether the early warning event is to occur, the shortest distance can ensure that a detection is made when the target object is closest to a detection point.

Step S712: for all the sub-targets, setting an associated velocity value ASS_Velocity of the same cluster as an average of the velocities of all the sub-targets in said cluster. For example, the associated velocity value ASS_Velocity of this cluster is set as velocity (v1+v2+v3)/3.

Step S713: estimating, based on the associated distance value and the associated velocity value of the cluster obtained in the previous time frame, a predicted distance of the cluster in the current time frame by a correlation relationship.

That is, the correlation relationship can be expressed by the following equation:

$$\text{Range}_{Predicted} = \text{Range}_{Previous} + \text{ASS\_Velocity} * \text{Time}_{cycle}.$$

Here, $\text{Range}_{Predicted}$ is the predicted distance of the current time frame, $\text{Range}_{Previous}$ is the distance of the previous time frame, $\text{Time}_{cycle}$ is a length of the time frame, and ASS_Velocity is the average velocity value of the previous time frame.

Step S714: in response to the predicted distance of the current time frame and the associated velocity value of the previous time frame matching with the associated distance value and the associated velocity value of any cluster obtained in the current time frame, configuring the processing circuit to update an information of the cluster that is determined to be matched to the associated distance value, the associated power value, and the associated velocity value of the current time frame. Here, the so-called "update" is to update the information of the cluster(s) that have been determined to match or have been associated in the previous time frame (such as the associated distance value, the associated power value and the associated velocity value of the previous time frame) to the associated distance value, the associated power value, and the associated velocity value of the cluster (of the current time frame) that is determined to be matched in the current time frame.

In detail, reference can be made to FIG. 8. At time 1, the powers, distances, and velocities of the cluster are calculated, and the above steps S710, S711, and S712 are performed to form the cluster C1 formed by the sub-targets "+" and the cluster C2 formed by the sub-target "*" defined at time 1.

Moreover, after step S713 is performed, a predicted distance and a velocity for estimating the cluster C1 and the cluster C2 can be calculated.

At time 2, similarly, the powers, distances and velocities of the cluster are calculated, and the above steps S710, S711, and S712 are performed to form the cluster C1 formed by the sub-targets "+" and the cluster C2 formed by the sub-targets "*" defined at time 2.

Then, the predicted distance and the velocity estimated at time 1 can be used to compare with the distance (associated distance value Ass_Range) and the velocity (associated velocity value Ass_Velocity) of each cluster detected at time 2. If there is a match, a new distance, a new velocity and a new power are obtained from the corresponding cluster.

Reference is made to FIG. 5 again. After the association process 144 ends, the object detection method of the present disclosure proceeds to the obstacle detection process 146. As shown in FIG. 5, the obstacle detection process 146 includes configuring the processing circuit 14 to perform the following steps.

Step S50: calculating a power trend and a distance trend of the main target.

Step S51: determining whether an early warning event is to occur according to a relationship between the power trend and the distance trend.

In response to the distance trend indicating that the main target is approaching, and the power trend indicating that the received powers corresponding to the main target are increasing, the obstacle detection process 146 proceeds to step S52: determining that the early warning event associated with the main target occurs.

In response to the distance trend indicating that the main target is approaching, and the power trend indicating that the received powers corresponding to the main target are decreasing, the obstacle detection process 146 proceeds to step S53: determining that the early warning event does not occur.

In addition, in response to the distance trend indicating that the main target is moving away, the obstacle detection process 146 proceeds to step S53: determining that the early warning event does not occur.

In detail, in step S50, the processing circuit 14 can be configured to calculate the relationship between the power trend and the distance trend through a linear regression, a logistic regression, a lasso regression, or a classification algorithm.

The linear regression is taken as an example, which is a technique for modeling the relationship between dependent variables. This modeling technique can be used to determine the relationship between the received power and the distance of the main target.

The linear equation can be expressed as:

$$y(\text{power}) = ax(\text{distance}) + b \quad \text{equation (1)}.$$

For y=ax+b, it is assumed that observation values are $\{(x1, y1), (x2, y2), \ldots, (xN, yN)\}$. When the linear regression is used in the present embodiment, $x_n$ and $y_n$ are a distance and an average received power (or the maximum of received powers) of the tracked main target within a nth time frame detected and tracked in a field of view of the radar.

An error of each observation value and a linear prediction thereof is: $\{(y_1-(ax_1+b)), (y_2-(ax_2+b)), \ldots, (y_N-(ax_N+b))\}$.

A square mean value of a prediction error E can be written as:

$$E(a,b) = \sum_{n=1}^{N}(y_n - (a \cdot x_n + b))^2 \quad \text{equation (2);}$$

$$E(a,b) = \sum_{n=1}^{N}(y_n^2 - 2 \cdot y_n(a \cdot x_n + b) + (a \cdot x_n + b)^2) \quad \text{equation (3).}$$

A minimization of E(a, b) relative to a yields the following equation (4):

$$\frac{\partial(E(a,b))}{\partial a} = 0; \quad \text{equation (4)}$$

$$\sum_{n=1}^{N}\left(-2 \cdot x_n \cdot y_n + 2 \cdot a \cdot x_n^2 + 2 \cdot b \cdot x_n\right) = 0; \quad \text{equation (5)}$$

$$-\sum_{n=1}^{N} x_n \cdot y_n + a\sum_{n=1}^{N} x_n^2 + b\sum_{n=1}^{N} x_n = 0; \quad \text{equation (6)}$$

$$a\sum_{n=1}^{N} x_n^2 + b\sum_{n=1}^{N} x_n = \sum_{n=1}^{N} x_n \cdot y_n. \quad \text{equation (7)}$$

A minimization of E(a, b) relative to b yields the following equations:

$$\frac{\partial(E(a,b))}{\partial b} = 0; \quad \text{equation (8)}$$

$$\sum_{n=1}^{N}(-2 \cdot y_n + 2 \cdot a \cdot x_n + 2 \cdot b) = 0; \quad \text{equation (9)}$$

$$\sum_{n=1}^{N} a \cdot x_n + b\sum_{n=1}^{N} 1 = \sum_{n=1}^{N} y_n; \quad \text{equation (10)}$$

$$\sum_{n=1}^{N} a \cdot x_n + bN = \sum_{n=1}^{N} y_n. \quad \text{equation (11)}$$

By solving equations (7) and (11), values of a and b can be found:

$$a = \frac{\left(N\sum_{n=1}^{N} x_n \cdot y_n - \sum_{n=1}^{N} x_n \sum_{n=1}^{N} y_n\right)}{\left(N\sum_{n=1}^{N} x_n^2 - \left(\sum_{n=1}^{N} x_n\right)^2\right)}; \quad \text{equation (12)}$$

$$b = \frac{\sum_{n=1}^{N} y_n - a\sum_{n=1}^{N} x_n}{N}. \quad \text{equation (13)}$$

Equations (12) and (13) can also be written as:

$$a = \frac{\left(N\left(\sum_{n=1}^{N-1} x_n \cdot y_n + x_N \cdot y_N\right) - \left(\left(\sum_{n=1}^{N-1} x_n + x_N\right)\left(\sum_{n=1}^{N-1} y_n + y_N\right)\right)\right)}{\left(N\left(\sum_{n=1}^{N-1} x_n^2 + x_N^2\right) - \left(\sum_{n=1}^{N-1} x_n + x_N\right)^2\right)}; \quad \text{equation (14)}$$

-continued $$b = \frac{\left(\sum_{n=1}^{N-1} y_n + y_N\right) - a\left(\sum_{n=1}^{N-1} x_n + x_N\right)}{N}.$$ equation (15)

Equations (12) and (13) show a one-shot method of measuring a slope and an intercept from the distances and powers collected in N time frames. Equations (14) and (15) can be used to complete this operation time frame by time frame. For example, in each time frame, a new distance and a new power information are obtained, and the slope and the intercept are calculated.

The slope is calculated within each time frame, instead of being calculated at the end. If the slope a is a positive value, the main target will not collide with the vehicle equipped with the transmitter 10, and no alarm will be issued. If the slope a is negative value, an alarm will be issued.

Figure 9A:
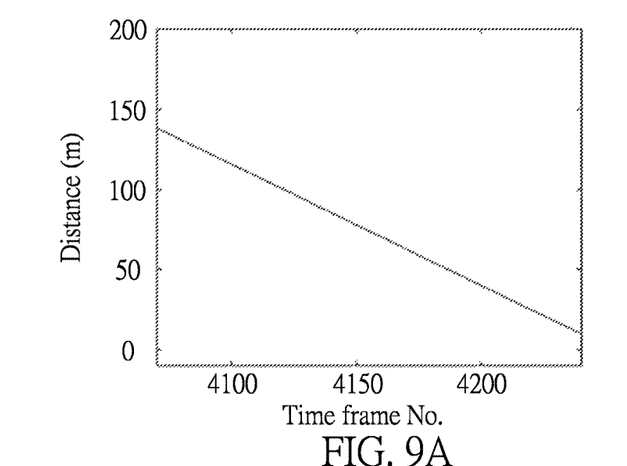
FIGS. 9A to 9C are each a schematic graph showing distances, average received powers, and slope variations of distances versus powers estimated by a linear regression in different time frames for a main target approaching a vehicle with a transmitter and being located in a main beam of the transmitter and not on a collision path.
Figure 9B:
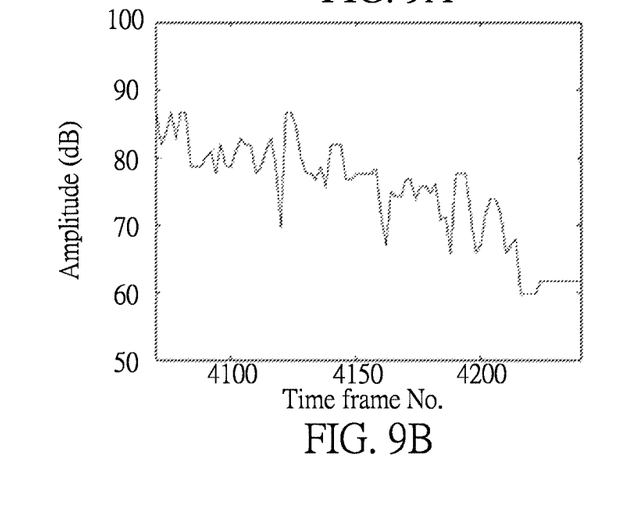
Figure 9C:
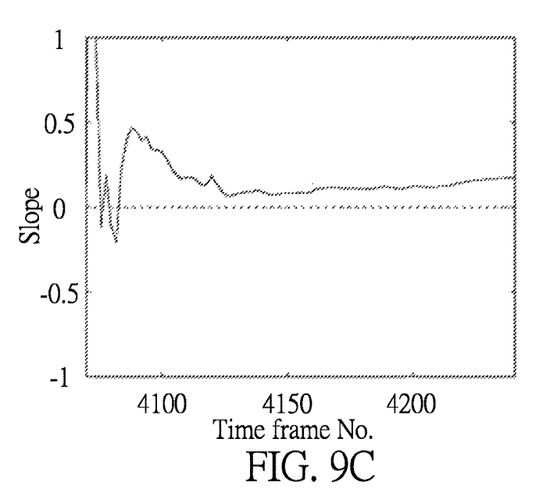
Figure 10:
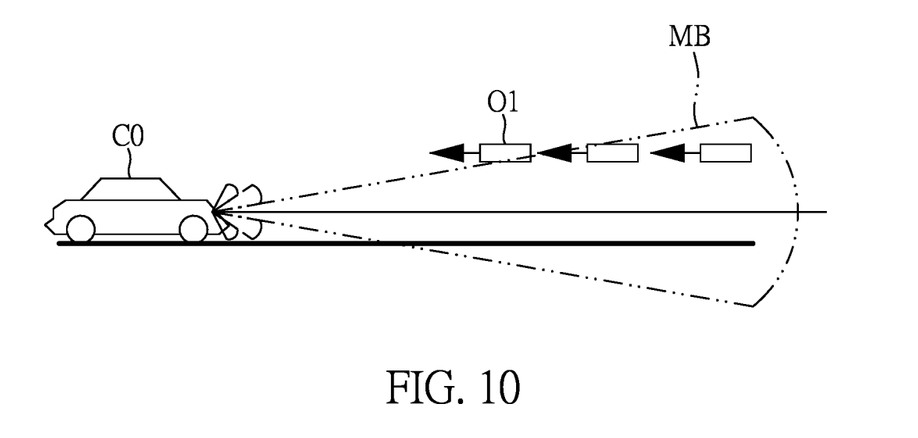
FIG. 10 is a schematic diagram illustrating detection of the main target that is an overhead object approaching the vehicle according to one embodiment of the present disclosure.

Reference is made to FIGS. 9A to 9C, each of which is a schematic graph showing distances, average received powers, and a slope variation curve of distances versus powers estimated by a linear regression of a case where a main target is approaching to a vehicle with a transmitter and located in a main beam of the transmitter while not on a collision path in different time frames. FIG. 10 is a schematic diagram illustrating a detection of a main target that is an overhead object approaching a vehicle according to one embodiment of the present disclosure.

In a situation shown by FIG. 10, referring to FIG. 9A, the distance of the main target decreases with time. However, referring to FIG. 9B, the average received power of the main target also decreases with time. The linear regression is further used for estimation, and it can be seen that the slope is a positive value. Therefore, this slope shows that the distance and the power have the same trend. However, the power trend indicates that the received power corresponding to the main target is decreasing, which means that the main target is moving away from a main beam of the transmitter 10. Thus, the early warning event does not occur.

In addition to using the linear regression to estimate the relationship between the power trend and the distance trend, Pearson correlation coefficient can also be used to estimate this relationship.

In an embodiment of the present disclosure, the Pearson correlation coefficient r equation can be rewritten as follows:

$$r_{xy} = \frac{N\sum_{n=1}^{N} x_n \cdot y_n - \sum_{n=1}^{N} x_n \sum_{n=1}^{N1} y_n}{\sqrt{N\sum_{n=1}^{N} x_n^2 - \left(\sum_{n=1}^{N-1} x_n\right)^2} \sqrt{N\sum_{n=1}^{N} y_n^2 - \left(\sum_{n=1}^{N} y_n\right)^2}}.$$ equation (16)

The above equation (16) is used to determine a relationship between variables. The aforementioned linear regression determines the relationship between variables by obtaining the slope. Dissimilarly, the correlation $r_{xy}$ explains how the variables are relative, and can also explain whether the variables required for a determination of the main target are directly related or inversely related.

The correlation coefficient ranges from −1 to 1. A value of the correlation coefficient being 1 indicates that the linear equation perfectly describes the relationship between two variables X and Y, with all data points lying on a line for which Y increases as X increases. The value of the correlation coefficient being −1 indicates that all the data points lie on another line for which Y decreases as X increases. The value of the correlation coefficient being 0 indicates that there is no linear correlation between the variables.

Hereinafter, Pearson's correlation coefficient is used to determine the relationship between the distance trend and the power trend for the embodiment of FIG. 10.

Figure 9D:
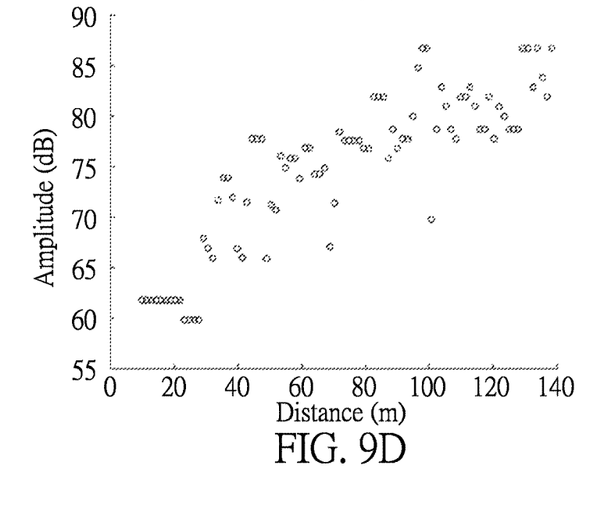
FIG. 9D is a schematic graph showing a correlation between distances and powers which has estimated positive Pearson product-moment correlation coefficient.

Reference is made to FIG. 9D, which is a schematic graph showing a correlation between distances and powers which has estimated positive Pearson product-moment correlation coefficient. Pearson's correlation coefficient $r_{xy}$ estimated in FIG. 9D (where a horizontal axis x is the distance and a vertical axis y is the power) is 0.8792. In other words, objects not on the collision path have a positive correlation value, and this positive correlation represents that the distance has the same trend as the power. Such a conclusion is the same as that of FIG. 9C.

Figure 11:
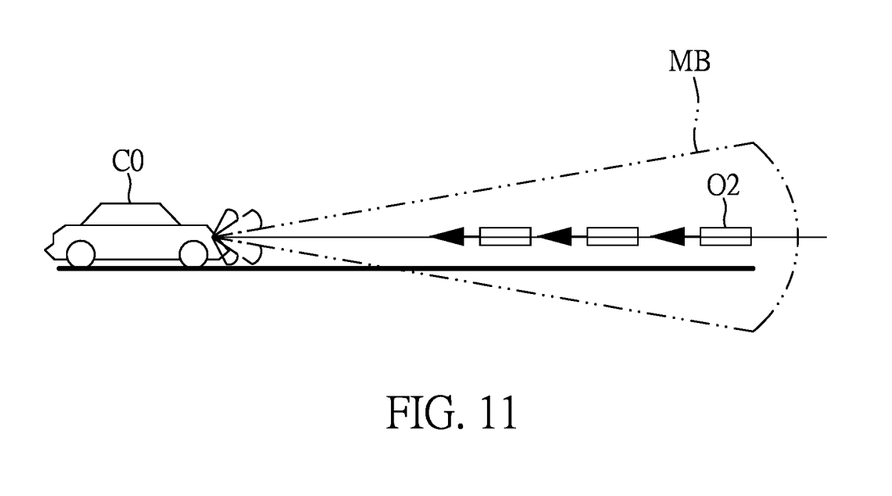
FIG. 11 is a schematic diagram illustrating detection of the main target approaching the vehicle and being on the collision path according to one embodiment of the present disclosure.
Figure 12A:
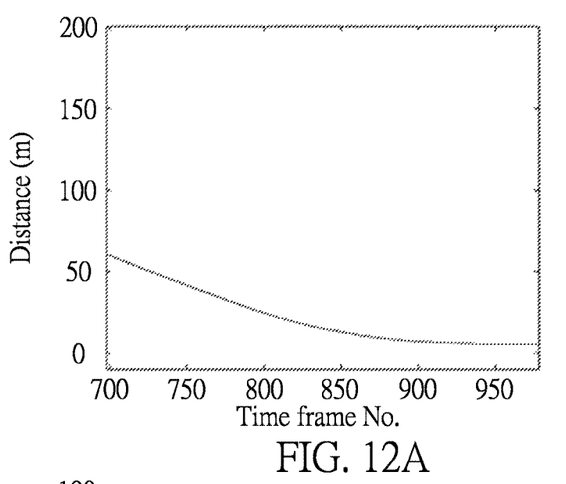
FIGS. 12A to 12C are each a schematic graph showing distances, average received powers, and slope variations of distances versus powers estimated by linear regression in different time frames for the main target approaching the vehicle with the transmitter and being located in the main beam of the transmitter and on the collision path.
Figure 12B:
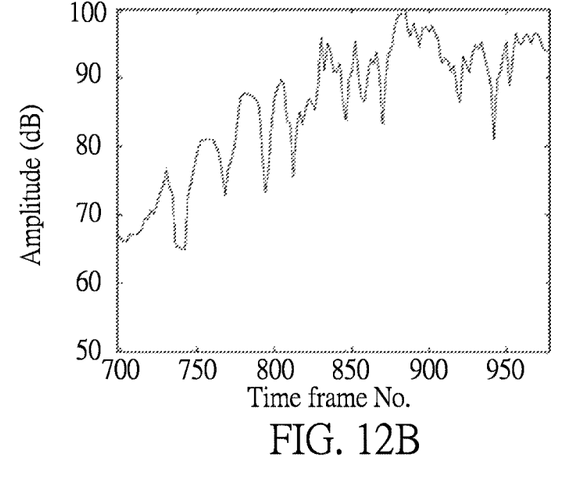
Figure 12C:
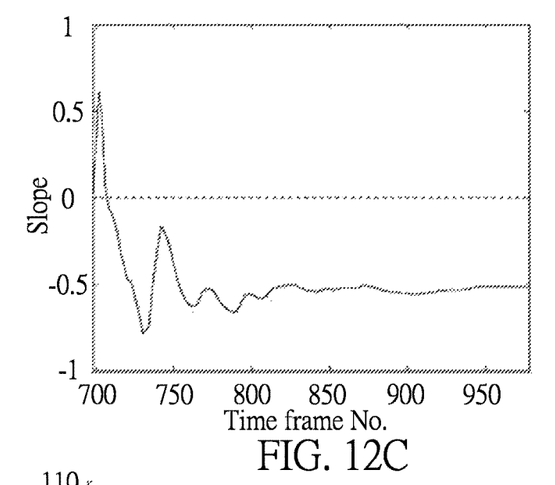

Reference is further made to FIG. 11 and FIGS. 12A to 12C. FIG. 11 is a schematic diagram illustrating a detection of a main target O2 approaching a vehicle and being on a collision path according to one embodiment of the present disclosure. FIGS. 12A to 12C are each a schematic graph showing distances, average received powers, and slope variations of distances versus powers estimated by linear regression in different time frames for the main target O2 approaching the vehicle C0 with the transmitter 10 and being located in the main beam MB of the transmitter 10 and on the collision path.

In a situation shown by FIG. 11, referring to FIG. 12A, the distance of the main target O2 decreases with time. Referring to FIG. 12B, the average received power of the main target O2 increases with time. Further, by using the linear regression, the slope is estimated to be negative. Therefore, this slope shows that the distance and the power have different trends. Since the distance decreases and the power increases, it can be seen that the main target is approaching the vehicle C0 along the main beam direction of the transmitter 10. Thus, the early warning event is determined to occur.

Figure 12D:
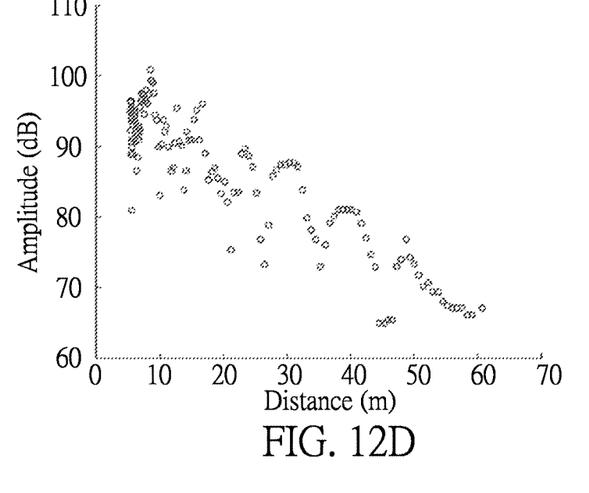
FIG. 12D is a schematic graph showing a correlation between distances and powers which has estimated negative Pearson product-moment correlation coefficient.

Similarly, reference is made to FIG. 12D, which is a schematic diagram showing a correlation between distances and powers estimated by Pearson product-moment correlation coefficient. Here, the Pearson's correlation coefficient $r_{xy}$ estimated in FIG. 12D (where a horizontal axis x is the distance and a vertical axis y is the power) is −0.83194. In other words, the objects on the collision path have a negative correlation value, and this negative correlation represents that the distance and the power have different trends. Such a conclusion is the same as that of FIG. 11C.

Beneficial Effects of the Embodiments

In conclusion, the object detection system and the object detection method provided by the present disclosure allows a trajectory of an object to be estimated without additional hardware modification, which is suitable for cases that do not require knowing an angle of the object relative to the transmitter with very high accuracy, and is also suitable for cases with multiple-target objects.

Further, in the present disclosure, the relationship between the distance trend and the power trend can be determined by calculating the distances of the reflection signals, the distance between the object and the receiver, and the received power without accurately determining an angle of the object. When it is only necessary to guess whether an object forms an obstacle, since the number of antennas required is small, the numbers of corresponding RF front-end circuits and analog-to-digital converters are also small. Therefore, the object detection system and object detection method of the present disclosure are superior to the existing radar systems in terms of cost and complexity.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An object detection system, comprising:
   a transmitter;
   a receiver; and
   a processing circuit connected to the transmitter and the receiver, wherein the processing circuit is configured to:
   control the transmitter to transmit by a predetermined field pattern a plurality of detection signals in different time frames along a main beam direction, wherein the main beam direction corresponds to a main beam in the predetermined field pattern beamformed by the transmitter;
   control the receiver to receive a plurality of reflection signals generated by reflections of the plurality of detection signals;
   correspondingly calculate a plurality of received powers, a plurality of distances, and a plurality of velocities according to the plurality of reflection signals;
   perform a clustering process on the plurality of distances and the plurality velocities to find the received powers, the distances, and the velocities corresponding to at least one main target;
   perform an association process to track the distances and the received powers of the at least one main target in the different time frames; and
   calculate a power trend and a distance trend of the at least one main target, and determine whether an early warning event is to occur according to a relationship between the power trend and the distance trend;
   wherein, in response to the distance trend indicating that the at least one main target is approaching, and the power trend indicating that the received powers corresponding to the at least one main target are increasing, the processing circuit is configured to determine that the early warning event is to occur with the at least one main target,
   wherein the plurality of reflection signals correspond to a plurality of sub-targets, and the clustering process includes:
   for each of the time frames, clustering the plurality of sub-targets according to a similarity of the plurality of velocities and the plurality of distances, so as to find at least one cluster of the sub-targets corresponding to the at least one main target; and
   for each of the time frames, averaging the received powers of the sub-targets corresponding to the at least one main target or obtaining a maximum one of the received powers of the sub-targets, so as to generate the received power of the at least one main target;
   wherein the association process includes:
   comparing the clustered sub-targets in the different time frames;
   pairing the at least one cluster clustered in a first time frame and the at least one cluster clustered in a second time frame according to the plurality of velocities and the plurality of distances;
   tracking the sub-targets corresponding to the at least one main target in each of the first time frame and the second time frame;
   for the plurality of sub-objects, obtaining a first associated distance value and a first associated velocity value of the at least one cluster in the first time frame;
   estimating, based on the first associated distance value and the first associated velocity value of the at least one cluster obtained in the first time frame, a predicted distance of the at least one cluster in the second time frame by a correlation relationship;
   for the plurality of sub-targets, obtaining a second associated distance value and a second associated velocity value of the at least one cluster in the second time frame; and
   determining whether the predicted distance and the first associated velocity value match with the second associated distance value and the second associated velocity value, wherein, in response to the predicted distance and the first associated velocity value matching with the second associated distance value and the second associated velocity value, the processing circuit is configured to update an information of the at least one cluster that is determined to be matched to the second associated distance value and the second associated velocity value.

2. The object detection system according to claim 1, wherein the transmitter includes a first radio frequency (RF) front-end circuit, and the receiver includes a second RF front-end circuit and an analog-to-digital converter (ADC).

3. The object detection system according to claim 1, wherein the processing circuit is further configured to calculate the relationship between the power trend and the distance trend through a linear regression, a logistic regression, a Lasso regression, or a classification algorithm.

4. The object detection system according to claim 1, wherein the power trend of the at least one main target is calculated according to a plurality of averaged powers or a maximum power, the plurality of averaged powers are generated by averaging the received powers corresponding to the sub-targets tracked in the different time frames, and the maximum power is generated by obtaining the maximum one of the received powers corresponding to the sub-targets tracked in the different time frames.

5. The object detection system according to claim 1, wherein the association process includes:
   for the plurality of sub-objects, obtaining a first associated power value of the at least one cluster in the first time frame; and
   for the plurality of sub-targets, obtaining a second associated power value of the at least one cluster in the second time frame;
   wherein, in response to the predicted distance and the first associated velocity value matching with the second associated distance value and the second associated velocity value, the processing circuit is configured to update the information of the at least one cluster that is determined to be matched to the second associated power value.

6. The object detection system according to claim 5, wherein the step of obtaining the first associated power value, the first associated distance value, and the first associated velocity value of the at least one cluster includes:
  setting the first associated power value of the at least one cluster as a maximum power value of the sub-targets in the at least one cluster in the first time frame, or as an average power value of the sub-targets in the at least one cluster in the first time frame;
  for the plurality of sub-objects, setting the first associated distance value of the at least one cluster as a minimum distance value of the distances of the sub-objects in the at least one cluster in the first time frame; and
  for the plurality of sub-targets, setting the first associated velocity value of the at least one cluster as an average value of the velocities of the sub-targets in the at least one cluster in the first time frame.

7. The object detection system according to claim 1, wherein, in response to the distance trend indicating that the at least one main target is approaching, and the power trend indicating that the received power corresponding to the at least one main target is decreasing, the processing circuit is configured to determine that the early warning event does not occur;
  wherein, in response to the distance trend indicating that the at least one main target is moving away, the processing circuit is configured to determine that the early warning event does not occur.

8. An object detection method for use in an object detection system, wherein the object detection system includes a transmitter, a receiver, and a processing circuit, and the object detection method comprises configuring the processing circuit to:
  control the transmitter to transmit by a predetermined field pattern a plurality of detection signals in different time frames along a main beam direction, wherein the main beam direction corresponds to a main beam in the predetermined field pattern beamformed by the transmitter;
  control the receiver to receive a plurality of reflection signals generated by reflections of the plurality of detection signals;
  correspondingly calculate a plurality of received powers, a plurality of distances, and a plurality of velocities according to the plurality of reflection signals;
  perform a clustering process on the plurality of distances and the plurality velocities to find the received powers, the distances, and the velocities corresponding to at least one main target;
  perform an association process to track the distances and the received powers of the at least one main target in different time frames; and
  calculate a power trend and a distance trend of the at least one main target, and determine whether an early warning event is to occur according to a relationship between the power trend and the distance trend;
  wherein, in response to the distance trend indicating that the at least one main target is approaching, and the power trend indicating that the received powers corresponding to the at least one main target are increasing, the processing circuit is configured to determine that the early warning event is to occur with the at least one main target,
  wherein the plurality of reflection signals correspond to a plurality of sub-targets, and the clustering process includes:
    for each of the time frames, clustering the plurality of sub-targets according to a similarity of the plurality of velocities and the plurality of distances, so as to find at least one cluster of the sub-targets corresponding to the at least one main target; and
    for each of the time frames, averaging the received powers of the sub-targets corresponding to the at least one main target or obtaining a maximum one of the received powers of the sub-targets, so as to generate the received power of the at least one main target;
  wherein the association process includes:
    comparing the clustered sub-targets in the different time frames;
    pairing the at least one cluster clustered in a first time frame and the at least one cluster clustered in a second time frame according to the plurality of velocities and the plurality of distances;
    tracking the sub-targets corresponding to the at least one main target in each of the first time frame and the second time frame;
    for the plurality of sub-objects, obtaining a first associated distance value and a first associated velocity value of the at least one cluster in the first time frame;
    estimating, based on the first associated distance value and the first associated velocity value of the at least one cluster obtained in the first time frame, a predicted distance of the at least one cluster in the second time frame by a correlation relationship;
    for the plurality of sub-targets, obtaining a second associated distance value and a second associated velocity value of the at least one cluster in the second time frame; and
    determining whether the predicted distance and the first associated velocity value match with the second associated distance value and the second associated velocity value, wherein, in response to the predicted distance and the first associated velocity value matching with the second associated distance value and the second associated velocity value, configuring the processing circuit to update an information of the at least one cluster that is determined to be matched to the second associated distance value and the second associated velocity value.

9. The object detection method according to claim 8, wherein the transmitter includes a first radio frequency (RF) front-end circuit, and the receiver includes a second RF front-end circuit and an analog-to-digital converter (ADC).

10. The object detection method according to claim 8, further comprising:
  configuring the processing circuit to calculate the relationship between the power trend and the distance trend through a linear regression, a logistic regression, a Lasso regression, or a classification algorithm.

11. The object detection method according to claim 8, wherein the power trend of the at least one main target is calculated according to a plurality of averaged powers or a maximum power, the plurality of averaged powers are generated by averaging the received powers corresponding to the sub-targets tracked in the different time frames, and the maximum power is generated by obtaining the maximum one of the received powers corresponding to the sub-targets tracked in the different time frames.

12. The object detection method according to claim 8, wherein the association process includes:
  for the plurality of sub-objects, obtaining a first associated power value of the at least one cluster in the first time frame;
  for the plurality of sub-targets, obtaining a second associated power value of the at least one cluster in the second time frame;

wherein, in response to the predicted distance and the first associated velocity value matching with the second associated distance value and the second associated velocity value, configuring the processing circuit to update the information of the at least one cluster that is determined to be matched to the second associated power value.

13. The object detection method according to claim 12, wherein the step of obtaining the first associated power value, the first associated distance value, and the first associated velocity value of the at least one cluster includes:

setting the first associated power value of the at least one cluster as a maximum power value of the sub-targets in the at least one cluster in the first time frame, or as an average power value of the sub-targets in the at least one cluster in the first time frame;

for the plurality of sub-objects, setting the first associated distance value of the at least one cluster as a minimum distance value of the distances of the sub-objects in the at least one cluster in the first time frame; and for the plurality of sub-targets, setting the first associated velocity value of the at least one cluster as an average value of the velocities of the sub-targets in the at least one cluster in the first time frame.

14. The object detection method according to claim 8, wherein, in response to the distance trend indicating that the at least one main target is approaching, and the power trend indicating that the received power corresponding to the at least one main target is decreasing, the processing circuit is configured to determine that the early warning event does not occur;

wherein, in response to the distance trend indicating that the at least one main target is moving away, the processing circuit is configured to determine that the early warning event does not occur.

* * * * *